(12) United States Patent
Sueyoshi

(10) Patent No.: US 11,135,878 B2
(45) Date of Patent: Oct. 5, 2021

(54) TIRE

(71) Applicant: Sumitomo Rubber Industries, Ltd., Kobe (JP)

(72) Inventor: Mitsuru Sueyoshi, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 240 days.

(21) Appl. No.: 15/861,392

(22) Filed: Jan. 3, 2018

(65) Prior Publication Data

US 2018/0207989 A1 Jul. 26, 2018

(30) Foreign Application Priority Data

Jan. 25, 2017 (JP) .............................. JP2017-010923

(51) Int. Cl.
| | |
|---|---|
| *B60C 11/11* | (2006.01) |
| *B60C 11/03* | (2006.01) |
| *B60C 11/01* | (2006.01) |
| *B60C 11/12* | (2006.01) |

(52) U.S. Cl.
CPC .......... *B60C 11/0316* (2013.01); *B60C 11/01* (2013.01); *B60C 11/0309* (2013.01); *B60C 11/11* (2013.01); *B60C 2011/1209* (2013.01); *B60C 2200/14* (2013.01)

(58) Field of Classification Search
CPC .............................. B60C 11/11; B60C 11/0306
See application file for complete search history.

(56) References Cited

U.S. PATENT DOCUMENTS

| | | | |
|---|---|---|---|
| 3,376,912 A | 4/1968 | Tiborez | |
| 2013/0139936 A1* | 6/2013 | Ohara | B60C 13/02 |
| | | | 152/209.11 |

(Continued)

FOREIGN PATENT DOCUMENTS

| | | |
|---|---|---|
| EP | 2923860 A2 | 9/2015 |
| EP | 3162595 A1 | 5/2017 |

(Continued)

OTHER PUBLICATIONS

Machine translation for Japan 03-189212 (Year: 2019).*

(Continued)

*Primary Examiner* — Steven D Maki
(74) *Attorney, Agent, or Firm* — Birch, Stewart, Kolasch & Birch, LLP

(57) ABSTRACT

A tire 1 comprises a tread portion 2 comprising shoulder blocks 3 and crown blocks 4. The shoulder blocks 3 each has a ground contacting surface (3*t*) comprising an axially outer portion 6 extending axially inwardly from one of tread edges (Te) and a steeply oblique portion 7 extending axially inwardly from the axially outer portion 6 with a larger inclination angle with respect to the tire axial direction than the axially outer portion 6. The crown blocks 4 each has a ground contacting surface (4*t*) comprising a first oblique portion 10 inclined oppositely to the steeply oblique portion 7 and a second oblique portion 11 extending from and obliquely and oppositely to the first oblique portion 10. In a development view of the tread portion 2, longitudinal directions of the steeply oblique portion 7 and the first oblique portion 10 intersect at an angle from 70 to 110 degrees.

20 Claims, 8 Drawing Sheets

(56) References Cited

U.S. PATENT DOCUMENTS

2015/0290977 A1* 10/2015 Yamamoto .............. B60C 11/11
                                                                 152/209.18
2015/0336430 A1* 11/2015 Sueyoshi ............ B60C 11/0316
                                                                 152/209.24
2017/0120687 A1*  5/2017 Okawara ............. B60C 11/1392

FOREIGN PATENT DOCUMENTS

| JP | 02-182505 A | * | 7/1990 |
| JP | 03-189212 A | * | 8/1991 |
| JP | 2015-202776 A | | 11/2015 |
| JP | 2015-202777 A | | 11/2015 |
| JP | 2016-147672 A | | 8/2016 |
| WO | WO-2011/080565 A1 | * | 7/2011 |

OTHER PUBLICATIONS

Machine translation for Japan 02-182505 (Year: 2020).*
Extended European Search Report for European Application No. 17200053.1, dated Apr. 30, 2018.

* cited by examiner

TIRE

TECHNICAL FIELD

The present invention relates to a pneumatic tire having improved dirt performance and on-road performance while maintaining mud performance.

BACKGROUND ART

For all season tires and M/S type tires for running on uneven ground, so-called mud performance that exerts sufficient soil discharging performance on muddy roads is required, for example. In order to improve the mud performance, a tire provided with a block pattern having a plurality of blocks in a tread portion is adopted.

However, conventional tires are not configured in consideration of lateral force due to the blocks during running in accelerating condition and in braking condition (hereinafter may be simply referred to as "during running"). For example, in a case where the lateral force is applied to each block in the same direction, it is possible that drifting tends to occur during on-dirt driving on a gravel road surface or on-road driving on a dry asphalt road surface.

SUMMARY OF THE INVENTION

The present invention was made in view of the above, and a primary object thereof is to provide a tire capable of improving the dirt performance and the on-road performance while maintaining the mud performance by improving shapes of ground contacting surfaces of crown blocks and shoulder blocks.

The tire according to the present invention comprises a tread portion comprising axially outer shoulder blocks and axially inner crown blocks, wherein each of the shoulder blocks has a ground contacting surface comprising an axially outer portion extending axially inwardly from one of tread edges, and a steeply oblique portion extending axially inwardly from the axially outer portion and having a larger inclination angle with respect to the tire axial direction than the axially outer portion, each of the crown blocks has a ground contacting surface comprising a first oblique portion inclined to an opposite direction to the steeply oblique portion of the shoulder block and a second oblique portion extending from the first oblique portion and obliquely in an opposite direction to the first oblique portion, and in a development view of the tread portion, a longitudinal direction of the steeply oblique portion and a longitudinal direction of the first oblique portion intersect each other at an angle in a range of from 70 to 110 degrees.

It is preferred that each of the first oblique portion and the second oblique portion is inclined with respect to the tire axial direction at an angle in a range of from 40 to 50 degrees.

It is preferred that maximum widths of the shoulder blocks in the tire axial direction are in a range of from 25% to 35% of a tread width.

It is preferred that the second oblique portion is connected with the first oblique portion at an inner end thereof in the tire axial direction.

It is preferred that an outer end in the tire axial direction of each of the crown blocks is provided in the first oblique portion thereof.

It is preferred that the ground contacting surfaces of the crown blocks extend across a tire equator, the crown blocks include first crown blocks whose respective major parts are disposed on a side of the tire equator closer to one of the tread edges and second crown blocks whose respective major parts are disposed on a side of the tire equator closer to the other one of the tread edges, and the first crown blocks and the second crown blocks are arranged alternately in a tire circumferential direction.

It is preferred that the first oblique portion of each of the crown blocks comprises a first outer block edge facing axially outward, and the first outer block edge comprises a first outer long side portion extending axially inwardly from an outer end in the tire axial direction of the first outer block edge and obliquely toward one side in the tire circumferential direction, and a first outer short side portion extending axially inwardly from the outer end and obliquely toward the other side in the tire circumferential direction and having a smaller length in the tire axial direction than the first outer long side portion.

It is preferred that the steeply oblique portion of each of the shoulder blocks comprises an inner shoulder block edge facing toward the tire equator and the inner shoulder block edge comprises an inner long side portion extending axially outwardly from an inner end in the tire axial direction of the inner shoulder block edge and obliquely toward one side in the tire circumferential direction, and an inner short side portion extending axially outwardly from the inner end and obliquely toward the other side in the tire circumferential direction and having a smaller length in the tire axial direction than the inner long side portion.

It is preferred that the steeply oblique portion of each of the shoulder blocks comprises an inner shoulder block edge facing toward the tire equator, the inner shoulder block edge comprises an inner long side portion extending axially outwardly from an inner end in the tire axial direction of the inner shoulder block edge and obliquely toward one side in the tire circumferential direction, and an inner short side portion extending axially outwardly from the inner end and obliquely toward the other side in the tire circumferential direction and having a smaller length in the tire axial direction than the inner long side portion, and the first outer short side portion faces the inner long side portion with a groove interposed therebetween.

It is preferred that in a pair of the shoulder blocks adjacent in the tire circumferential direction, the first outer long side portion of one of the pair of the shoulder blocks faces the inner short side portion of the other one of the pair of the shoulder blocks with a groove interposed therebetween.

DESCRIPTION OF THE PREFERRED EMBODIMENTS

An embodiment of the present invention will now be described in conjunction with accompanying drawings.

Figure 1:
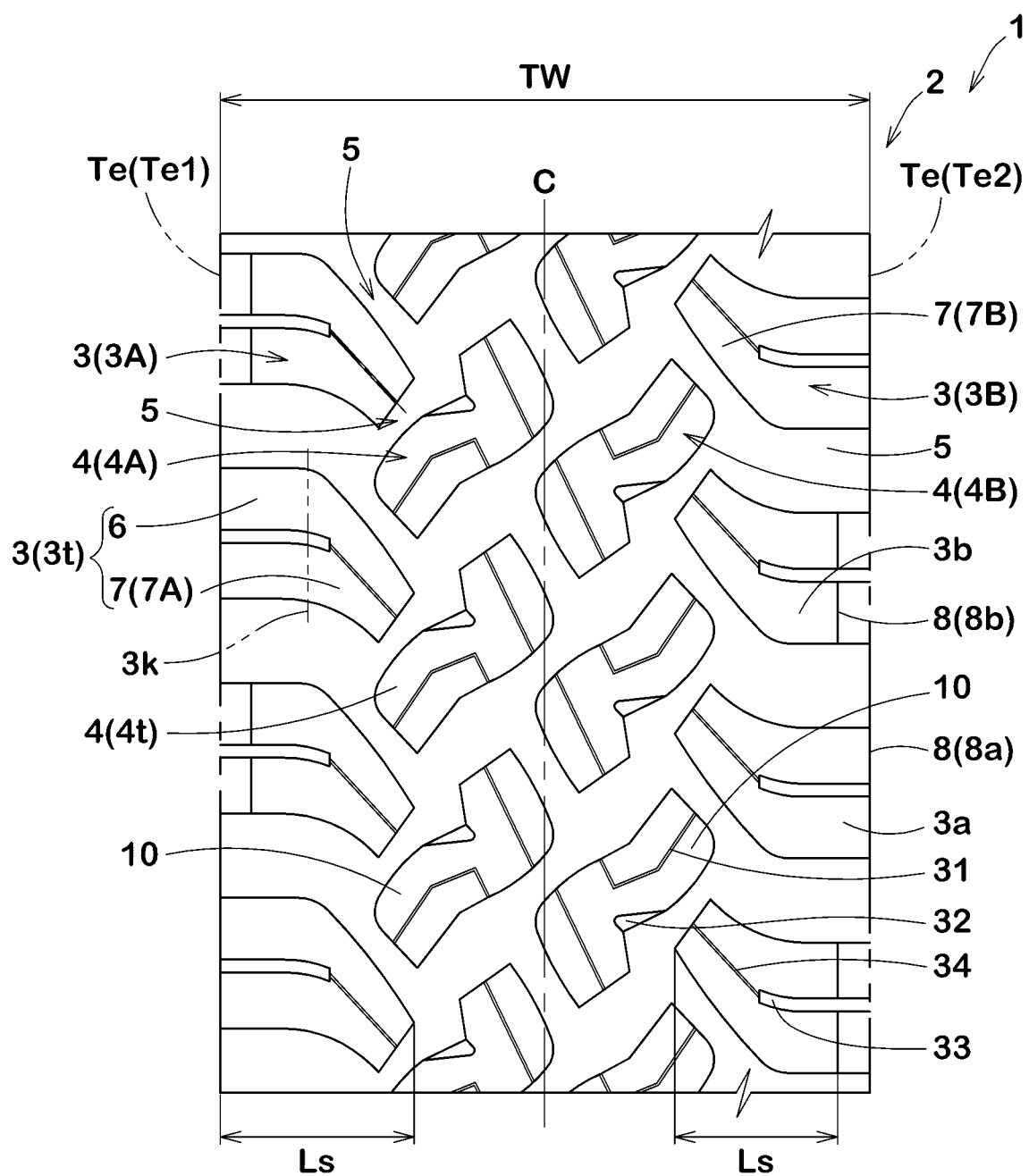
FIG. 1 is a development view of a tread portion of a tire as an embodiment of the present invention.

FIG. 1 is a development view of a tread portion 2 of a tire 1 as an embodiment of the present invention. The present invention can be used for various tires such as a pneumatic tire for a passenger car and a pneumatic tire for heavy duty, and a non-pneumatic tire having no pressurized air therein, and the like, for example. The tire 1 in this embodiment is an all season tire for a 4WD-car.

As shown in FIG. 1, the tread portion 2 of the tire 1 is provided with shoulder blocks 3 arranged on a side of tread edges (Te) and crown blocks 4 arranged on an inner side of the shoulder blocks 3 in a tire axial direction. The tread portion 2 in this embodiment is provided with grooves 5 extending between the shoulder blocks 3, between the crown blocks 4, and between the shoulder blocks 3 and the crown blocks 4.

The shoulder blocks 3 in this embodiment include first shoulder blocks 3A arranged on a side of a tread edge Te1 on one side (left side in FIG. 1) in the tire axial direction and second shoulder blocks 3B arranged on a side of a tread edge Te2 on the other side (right side in FIG. 1) in the tire axial direction. The first shoulder blocks 3A and the second shoulder blocks 3B have substantially same shapes and are arranged in a tire circumferential direction, and are disposed point symmetrically with respect to a tire equator (C).

The crown blocks 4 in this embodiment include first crown blocks 4A arranged on a side of the first shoulder blocks 3A and second crown blocks 4B arranged on a side of the second shoulder blocks 3B. The first crown blocks 4A and the second crown blocks 4B have substantially same shapes and are arranged in the tire circumferential direction, and are disposed point symmetrically with respect to the tire equator (C).

The "tread edges Te" are defined as axially outermost ground contacting positions when the tire 1 in a standard state is in contact with a flat surface with zero camber angle by being loaded with a standard tire load. The standard state is a state in which the tire 1 is mounted on a standard rim, inflated to a standard pressure, and loaded with no tire load. The tread width TW is defined as a distance in the tire axial direction between the tread edges Te in the standard state. Unless otherwise noted, dimensions and the like of various parts of the tire are values measured in the standard state.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. If the tire is for a passenger car, the standard pressure is 180 kPa.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. If the tire is for a passenger car, the standard load is a load equivalent to 88% of the above listed loads.

A ground contacting surface (3t) of each of the shoulder blocks 3 includes an axially outer portion 6 extending axially inwardly from a side of one of the tread edges (Te) and a steeply oblique portion 7 extending continuously from the axially outer portion 6 and having a larger angle with respect to the tire axial direction than the axially outer portion 6. The shoulder blocks 3 configured as such are elastically deformed upon contacting the ground, and can efficiently discharge mud which is stuck between the axially outer portion 6 and the steeply oblique portion 7. Therefore, the tire 1 in this embodiment exerts high mud performance.

In this specification, the axially outer portion 6 and the steeply oblique portion 7 are divided by a shoulder block center line (3k) (indicated by an imaginary line in the figures) on the ground contacting surface (3t) extending in the tire circumferential direction through an axially center position of the shoulder block 3.

Figure 2:
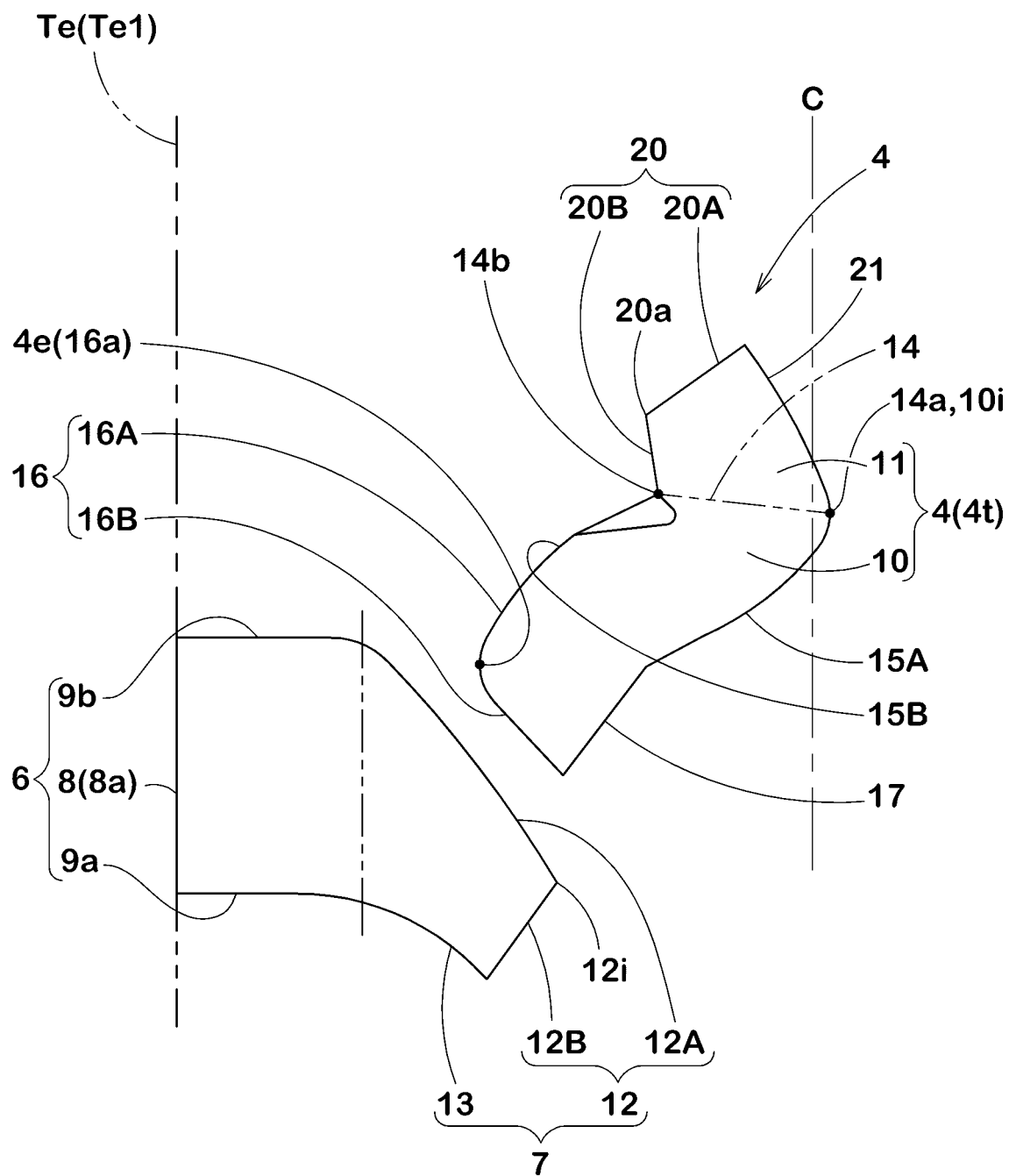
FIG. 2 is an enlarged view of ground contacting surfaces of a shoulder block and a crown block of FIG. 1.

As shown in FIG. 2, a ground contacting surface (4t) of each of the crown blocks 4 includes a first oblique portion 10 and a second oblique portion 11 extending continuously from the first oblique portion 10 and obliquely in a direction opposite to the first oblique portion 10. Further, the first oblique portion 10 is inclined in the opposite direction to the steeply oblique portion 7. The crown blocks 4 configured as such are also elastically deformed upon contacting the ground, and thus easily discharge mud which is stuck between the first oblique portion 10 and the second oblique portion 11. Thereby, the mud performance is maintained high. The second oblique portion 11 in this embodiment is inclined toward one of the tread edges (Te). Furthermore, a direction of the lateral force generated by the steeply oblique portion 7 of the shoulder block 3 and a direction of the lateral force generated by the first oblique portion 10 of the crown block 4 inclined in the opposite direction to the steeply oblique portion 7 are opposite to each other, therefore, these forces are canceled. Thereby, drifting during on-dirt driving or on-road driving is suppressed, therefore, the dirt performance and the on-road performance are improved. In FIG. 2, for convenience, a sipe 31 and a cutout portion 32 (shown in FIG. 1) provided in each of the crown blocks 4, and a lug groove 33 and a sipe 34 (shown in FIG. 1) provided in each of the shoulder blocks 3 are omitted.

In this specification, "the first oblique portion 10 and the second oblique portion 11 are inclined in the opposite directions" means that a block center line (10c) of the first oblique portion 10 described later and a block center line (11c) of the second oblique portion 11 described later are inclined in opposite directions to each other with respect to the tire axial direction. In this specification, "the first oblique portion 10 is inclined in a direction opposite to the steeply oblique portion 7" means that the block center line (10c) described later and a block center line (7c) of the steeply oblique portion 7 described later are inclined in opposite directions to each other with respect to the tire axial direction.

The first oblique portion 10 and the second oblique portion 11 are divided by a crown block imaginary line 14. The crown block imaginary line 14 is a line segment on the ground contacting surface (4t) that connects an inner distant point (14a) and an outer distant point (14b) in the tire axial direction. The inner distant point (14a) is a farthest point from the shoulder blocks 3 on an inner edge 15A in the tire axial direction, which protrudes in a direction axially away from the shoulder blocks 3, of the ground contacting surface (4*t*) of the crown block 4. The outer distant point (14*b*) is a farthest point from the shoulder blocks 3 on an outer edge 15B in the tire axial direction, which protrudes in a direction axially away from the shoulder blocks 3, of the ground contacting surface (4*t*) of the crown block 4. Thus, the second oblique portion 11 is connected with the first oblique portion 10 at an inner end (10*i*) in the tire axial direction of the first oblique portion 10.

Figure 3:
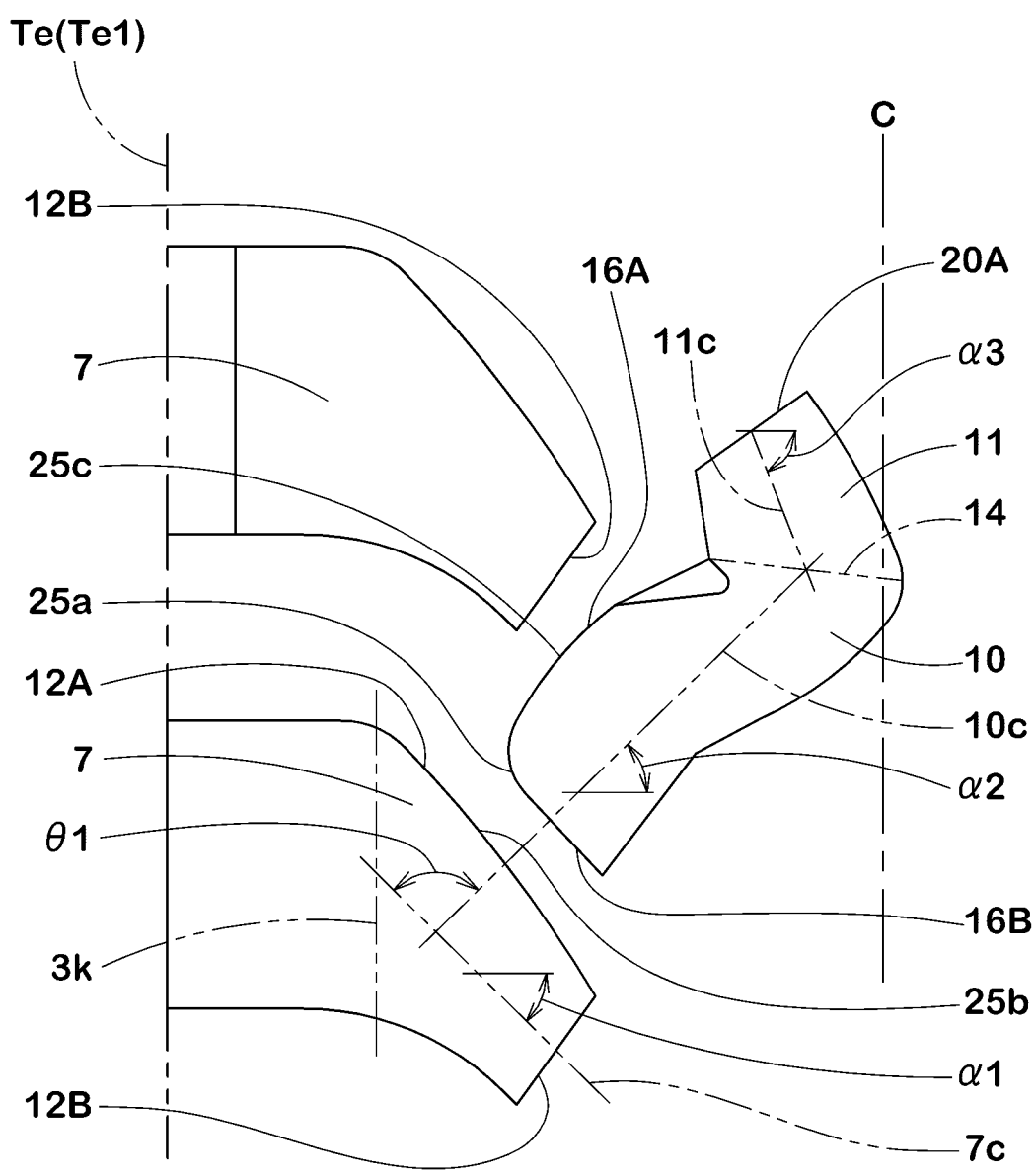
FIG. 3 is an enlarged view of the ground contacting surfaces of the shoulder blocks and the crown block of FIG. 1.

As shown in FIG. 3, in the tire 1 in this embodiment, a longitudinal direction of the steeply oblique portion 7 and a longitudinal direction of the first oblique portion 10 intersect each other at an angle θ1 in a range of from 70 to 110 degrees. Thereby, the above described effect of canceling the lateral forces is effectively exerted. If the angle θ1 is smaller than 70 degrees or if the angle θ1 is larger than 110 degrees, the balance is deteriorated between components in the tire axial direction and the tire circumferential direction of the lateral force generated during running, therefore, the effect of canceling the lateral force is decreased. From this point of view, the angle θ1 is preferably in a range of from 80 to 100 degrees, more preferably in a range of from 85 to 95 degrees.

The angle θ1 of the steeply oblique portion 7 and the first oblique portion 10 is an angle between the block center line (7*c*) of the steeply oblique portion 7 and the block center line (10*c*) of the first oblique portion 10. That is, the block center line (7*c*) indicates the longitudinal direction of the steeply oblique portion 7. The block center line (10*c*) indicates the longitudinal direction of the first oblique portion 10. The block center line (7*c*) of the steeply oblique portion 7 is a straight line connecting a center position in the tire circumferential direction of the shoulder block center line (3*k*) and a center position in the tire circumferential direction of an inner short side portion 12B described later. The block center line (10*c*) of the first oblique portion 10 is a straight line connecting a center position in the tire circumferential direction of the crown block imaginary line 14 and a center position in the tire circumferential direction of a first outer short side portion 16B described later.

As shown in FIG. 2, the axially outer portion 6 in this embodiment includes a shoulder circumferential edge 8 defining an axially outer ground contacting edge and a pair of shoulder axial edges (9*a*) and (9*b*) extending axially inwardly from both ends of the shoulder circumferential edge 8. The axially outer portion 6 in this embodiment extends substantially along the tire axial direction.

The shoulder circumferential edges 8 in this embodiment include first circumferential edges (8*a*) provided on the tread edges (Te) and second circumferential edges (8*b*) (shown in FIG. 1) provided on axially inner sides of the tread edges (Te). Thereby, the shoulder blocks 3 are divided into outer shoulder blocks (3*a*) having the first circumferential edges (8*a*) and inner shoulder blocks (3*b*) (shown in FIG. 1) having second circumferential edges (8*b*). The outer shoulder blocks (3*a*) and the inner shoulder blocks (3*b*) in this embodiment are arranged alternately in the tire circumferential direction. The shoulder blocks 3 configured as such smoothly discharge mud and the like between the shoulder blocks 3 toward the tread edges (Te), therefore, the soil discharging performance is improved.

The steeply oblique portion 7 in this embodiment includes an inner shoulder block edge 12 facing toward the tire equator (C) and an outer shoulder block edge 13 facing toward corresponding one of the tread edges (Te). The inner shoulder block edge 12 includes an inner long side portion 12A and the inner short side portion 12B having a smaller length in the tire axial direction than the inner long side portion 12A.

The inner long side portion 12A extends axially outwardly from an inner end (12*i*) of the inner shoulder block edge 12 and obliquely toward one side (upper side in the figures) in the tire circumferential direction. The inner short side portion 12B extends axially outwardly from the inner end (12*i*) of the inner shoulder block edge 12 and obliquely toward the other side (lower side in the figures) in the tire circumferential direction. The inner long side portion 12A and the inner short side portion 12B configured as such have different components from each other in the tire circumferential direction and in the tire axial direction, therefore, elastic deformation of the steeply oblique portion 7 is promoted.

The inner long side portion 12A in this embodiment is smoothly connected with the shoulder axial edge (9*b*) by an arc. The inner short side portion 12B in this embodiment connects between inner ends in the tire axial direction of the inner long side portion 12A and the outer shoulder block edge 13. The outer shoulder block edge 13 in this embodiment is smoothly connected with the shoulder axial edge (9*a*) by an arc.

The inner long side portion 12A and the outer shoulder block edge 13 are inclined in the same direction with respect to the tire axial direction. The inner short side portion 12B is inclined in the opposite direction to the inner long side portion 12A and the outer shoulder block edge 13. Thereby, rigidity of an axially inner part of the steeply oblique portion 7 is secured high, and it is possible that large shearing force is exerted against mud and the like.

As shown in FIG. 3, it is preferred that an angle α1 of the steeply oblique portion 7 with respect to the tire axial direction is in a range of from 40 to 50 degrees. Thereby, mud stuck between the steeply oblique portion 7 and the axially outer portion 6 is easily discharged. The angle α1 of the steeply oblique portion 7 is an angle of the block center line (7*c*) with respect to the tire axial direction.

As shown in FIG. 1, it is preferred that maximum lengths (Ls) in the tire axial direction of the shoulder blocks 3 are in a range of from 25% to 35% of the tread width TW. When the angles θ1 between the steeply oblique portions 7 and the first oblique portions 10 are set to be in a range of from 70 to 110 degrees, it is possible that the lateral forces generated during running are canceled out. However, the shoulder blocks 3 are arranged axially outside the crown blocks 4, therefore, rotational radii of the ground contacting surfaces (3*t*) of the shoulder blocks 3 of the tire 1 are different from rotational radii of the ground contacting surfaces (4*t*) of the crown blocks 4 of the tire 1. Thereby, it is considered that directions of forces applied to the shoulder blocks 3 and the crown blocks 4 vary. Therefore, when the angles θ1 between the steeply oblique portions 7 and the first oblique portions 10 are in the above range, it is possible that a residual cornering force (hereinafter may be referred to as "residual CF") during steady running such as coasting is deteriorated. Thereby, by setting the maximum lengths (Ls) of the shoulder blocks 3 to be in a range of from 25% to 35% of the tread width TW, components of the shoulder blocks 3 in the tire axial direction are ensured, therefore, it is possible that the residual CF during steady running is decreased. Thereby, the dirt performance and the on-road performance are maintained high. Note that if the maximum lengths (Ls) of the shoulder blocks 3 are larger than 35% of the tread width TW, volume of the grooves 5 becomes small, therefore, it is possible that the soil discharging performance is deteriorated.

The steeply oblique portions 7A of the first shoulder blocks 3A and the steeply oblique portions 7B of the second shoulder blocks 3B in this embodiment are inclined in the same direction with respect to the tire circumferential direction.

As shown in FIG. 2, the first oblique portion 10 includes a first outer block edge 16 facing axially outward and a first inner block edge 17 facing axially inward. The first outer block edge 16 includes a first outer long side portion 16A and the first outer short side portion 16B having a smaller length in the tire axial direction than that of the first outer long side portion 16A. The first outer long side portion 16A extends axially inwardly from an outer end (16a) in the tire axial direction of the first outer block edge 16 and obliquely toward one side (upper side in the figures) in the tire circumferential direction. The first outer short side portion 16B extends axially inwardly from the outer end (16a) and obliquely toward the other side (lower side in the figures) in the tire circumferential direction. The first outer long side portions 16A and the first outer short side portions 16B configured as such have different components from each other in the tire circumferential direction and in the tire axial direction, therefore, elastic deformation of the first oblique portions 10 is promoted.

The first inner block edges 17 and the first outer long side portions 16A are each inclined in the same directions with respect to the tire axial direction. The first outer short side portions 16B are inclined in the opposite directions to the first inner block edges 17 and the first outer long side portions 16A. Thereby, rigidity of the first oblique portions 10 is maintained high, therefore, it is possible that large shearing force is exerted against mud and the like.

The first oblique portions 10 extend to the axially outside of the second oblique portions 11. That is, outer ends (4e) in the tire axial direction of the crown blocks 4 are provided in the first oblique portions 10.

The second oblique portion 11 in this embodiment includes a second outer block edge 20 facing axially outward and a second inner block edge 21 facing axially inward and extending across the tire equator (C). The second outer block edge 20 includes a second outer long side portion 20A and a second outer short side portion 20B having a smaller length in the tire axial direction than the second outer long side portion 20A. The second outer long side portion 20A extends axially inwardly from an outer end (20a) in the tire axial direction of the second outer block edge 20 and obliquely toward one side with respect to the tire axial direction. The second outer short side portion 20B extends axially inwardly from the outer end (20a) and obliquely toward the other side with respect to the tire axial direction. The second outer long side portions 20A and the second outer short side portions 20B configured as such have different components from each other in the tire circumferential direction and in the tire axial direction, therefore, elastic deformation of the second oblique portions 11 is promoted.

The second outer short side portions 20B and the second inner block edges 21 are inclined in the same directions with respect to the tire axial direction. The second outer long side portions 20A are inclined in the opposite directions to the second outer short side portions 20B and the second inner block edges 21. Thereby, it is possible that the second oblique portions 11 exert large shearing force against mud and the like.

As shown in FIG. 3, it is preferred that an angle $\alpha 2$ of the first oblique portion 10 with respect to the tire axial direction is in a range of from 40 to 50 degrees. It is preferred that an angle $\alpha 3$ of the second oblique portion 11 with respect to the tire axial direction is in a range of from 40 to 50 degrees. Thereby, mud stuck between the first oblique portion 10 and the second oblique portion 11 is discharged more easily.

Further, the angles $\alpha 2$ and the angles $\alpha 3$ configured as such effectively cancel out directions of the lateral forces generated by the first oblique portions 10 and the second oblique portions 11 during running. Thereby, drifting during on-dirt driving and on-road driving is suppressed, therefore, the dirt performance and the on-road performance are further improved.

The angle $\alpha 2$ of the first oblique portion 10 is an angle of the block center line (10c) of the first oblique portion 10 with respect to the tire axial direction. The angle 3 of the second oblique portion 11 is an angle of the block center line (11c) of the second oblique portion 11 with respect to the tire axial direction. The block center line (11c) of the second oblique portion 11 is a straight line connecting the center position in the tire circumferential direction of the crown block imaginary line 14 and a center position in the tire circumferential direction of the second outer long side portion 20A.

Figure 4:
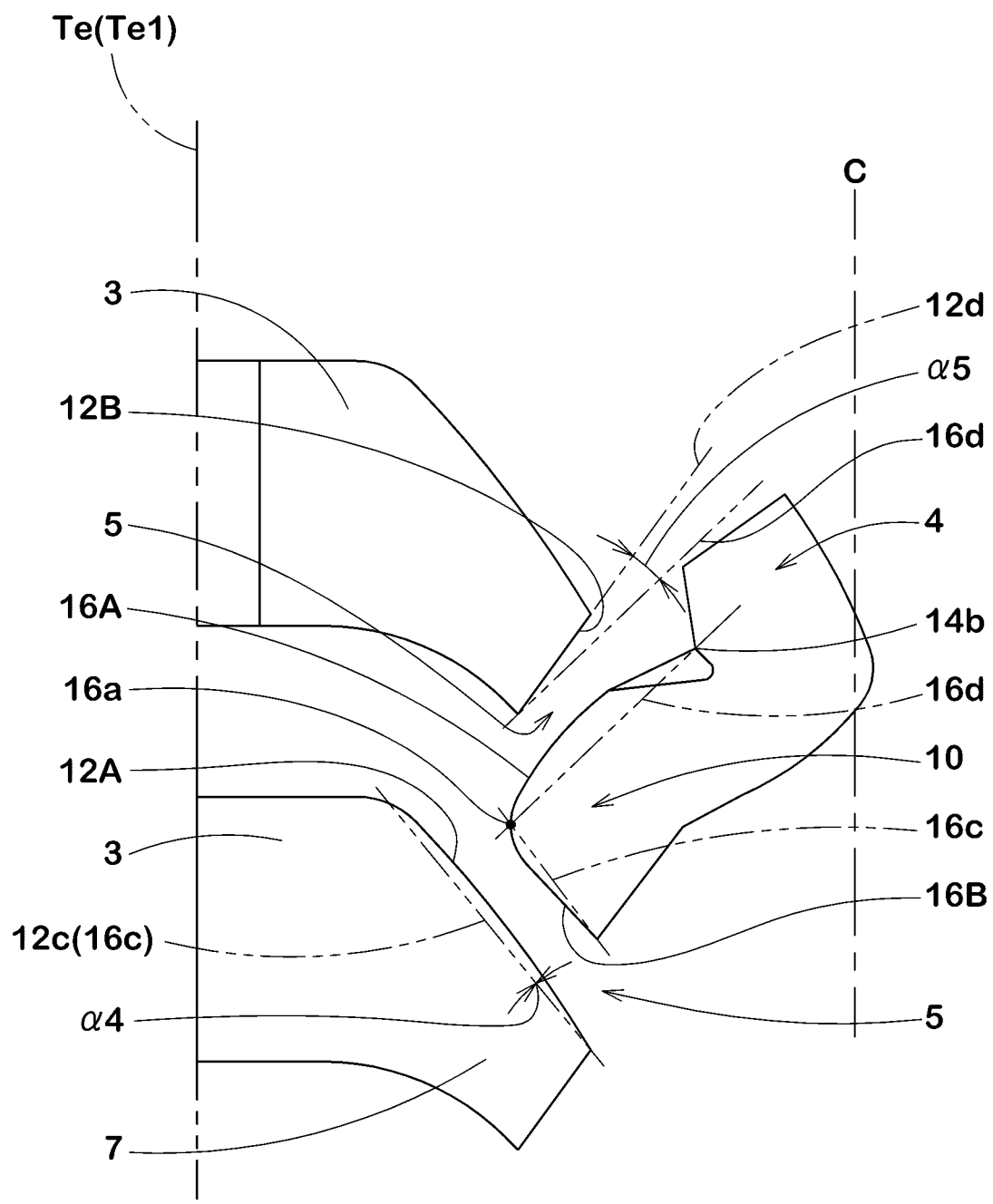
FIG. 4 is an enlarged view of the ground contacting surfaces of the shoulder blocks and the crown block of FIG. 1.

As shown in FIG. 4, the first outer short side portion 16B in this embodiment faces the inner long side portion 12A with the groove 5 interposed therebetween. Thereby, the cancellation effect of lateral forces generated during running by the steeply oblique portion 7 and the first oblique portion 10 is effectively exerted. The term "face" used above means a state in which an imaginary line (12c) obtained by connecting both ends of the inner long side portion 12A with a straight line and an imaginary line (16c) obtained by connecting both ends of the first outer short side portion 16B with a straight line intersect at an angle $\alpha 4$ not greater than 15 degrees.

In order to effectively exert the above-mentioned effects, the first outer long side portion 16A in this embodiment faces the inner short side portion 12B of the shoulder block 3 adjacent in the tire circumferential direction (upper side in the figures) to the shoulder blocks 3 whose inner long side portion 12A faces the first outer short side portion 16B as described above with the groove 5 interposed therebetween. The term "face" used above means a state in which an imaginary line (12d) obtained by connecting both ends of the inner short side portion 12B with a straight line and an imaginary line (16d) obtained by connecting both ends of the first outer long side portion 16A with a straight line intersect at an angle $\alpha 5$ not greater than 15 degrees.

As shown in FIG. 3, the first outer short side portion 16B in this embodiment includes an arc portion (25a) formed in an arc shape and protruding toward the inner long side portion 12A. The inner long side portion 12A in this embodiment includes an arc portion (25b) formed in an arc shape and protruding toward the first outer short side portion 16B. The arc portions (25a) and (25b) configured as such can apply large pressing force to mud stuck in the grooves 5 between the first outer short side portion 16B and the inner long side portion 12A, therefore, the soil discharging performance is improved.

The first outer long side portion 16A in this embodiment includes an arc portion (25c) formed in an arc shape and protruding toward the inner short side portion 12B. Thereby, large pressing force is also applied to mud stuck in the groove 5 between the first outer long side portion 16A and the inner short side portion 12B.

As shown in FIG. 1, the ground contacting surfaces (4t) of the crown blocks 4 in this embodiment extend across the tire equator (C). Thereby, high block rigidity is secured on the tire equator (C) to which large ground contact pressure is applied during straight running, therefore, the on-road performance is improved.

The first crown blocks 4A in this embodiment have the first oblique portions 10 extending in a direction from the tire equator (C) to the tread edge Te1 on one side. The second crown blocks 4B in this embodiment have the first oblique portions extending in a direction from the tire equator (C) to the tread edge Te2 on the other side.

The first crown blocks 4A and the second crown blocks 4B are arranged alternately in the tire circumferential direction. Thereby, tread rigidity in the vicinity of the tire equator (C) is maintained in a good balance, therefore, drifting during on-dirt driving or on-road driving is further suppressed.

Figure 5:
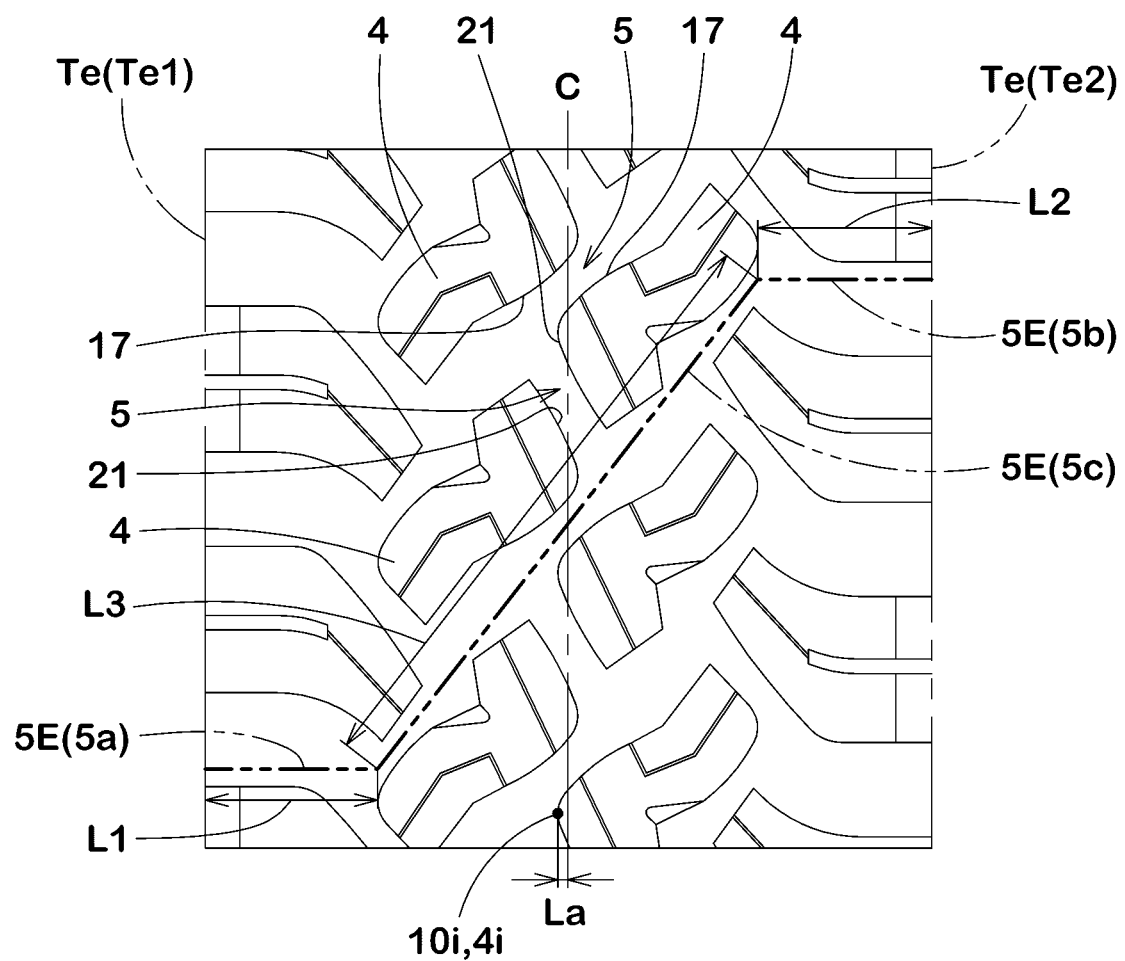
FIG. 5 is a development view of the tread portion of FIG. 1.

As shown in FIG. 5, it is preferred that a distance (La) in the tire axial direction between an inner end (4i) of the crown block 4 (which is the same as the inner end (10i) in the tire axial direction of the first oblique portion 10) and the tire equator (C) is in a range of from 1% to 3% of the tread width TW. If the distance (La) is large, a width of the grooves 5 formed between the first inner block edges 17 of the crown blocks 4 adjacent to each other in the tire axial direction and a width of the groove 5 formed between the second inner block edges 21 of the crown blocks 4 adjacent to each other in the tire axial direction become small, therefore, it is possible that the mud performance is deteriorated. If the distance (La) is small, the tread rigidity in the vicinity of the tire equator (C) becomes small, therefore, it is possible that drifting during the on-dirt driving and the on-road driving is deteriorated.

The grooves 5 in this embodiment include groove portions 5E each continuously connecting between the tread edge Te1 on one side in the tire axial direction and the tread edge Te2 on the other side in the tire axial direction. Each of the groove portions 5E includes a first axial direction portion (5a), a second axial direction portion (5b), and an oblique portion (5c). The first axial direction portion (5a) is a portion extending along the tire axial direction from the tread edge Te1 on one side in the tire axial direction. The second axial direction portion (5b) is a portion extending along the tire axial direction from the tread edge Te2 on the other side in the tire axial direction. Each of the first axial direction portion (5a) and the second axial direction portion (5b) in this embodiment is formed by a tire axial direction component. The oblique portion (5c) is a portion connecting the first axial direction portion (5a) and the second axial direction portion (5b) and inclined to one side with respect to the tire axial direction.

It is preferred that a length (L1+L2+L3) of the groove portion 5E is in a range of from 135% to 145% of the tread width TW (shown in FIG. 1). If the length (L1+L2+L3) of the groove portion 5E is less than 135% of the tread width TW, it is possible that a balance of components in the tire axial direction and the tire circumferential direction of the first oblique portion 10 and the steeply oblique portion 7 (shown in FIG. 1) is deteriorated. Thereby, drifting during the on-dirt driving and the on-road driving is not suppressed, therefore, it is possible that the dirt performance and the on-road performance are deteriorated. If the length (L1+L2+L3) of the groove portion 5E is larger than 145% of the tread width TW, the length of the groove portion 5E becomes large, therefore, it is possible that mud and the like in the grooves 5 becomes difficult to be discharged. Note that it is preferred that a length L1 of the first axial direction portion (5a) and a length L2 of the second axial direction portion (5b) are in a range of from 15% to 25% of the length (L1+L2+L3) of the groove portion 5E.

Figure 6:
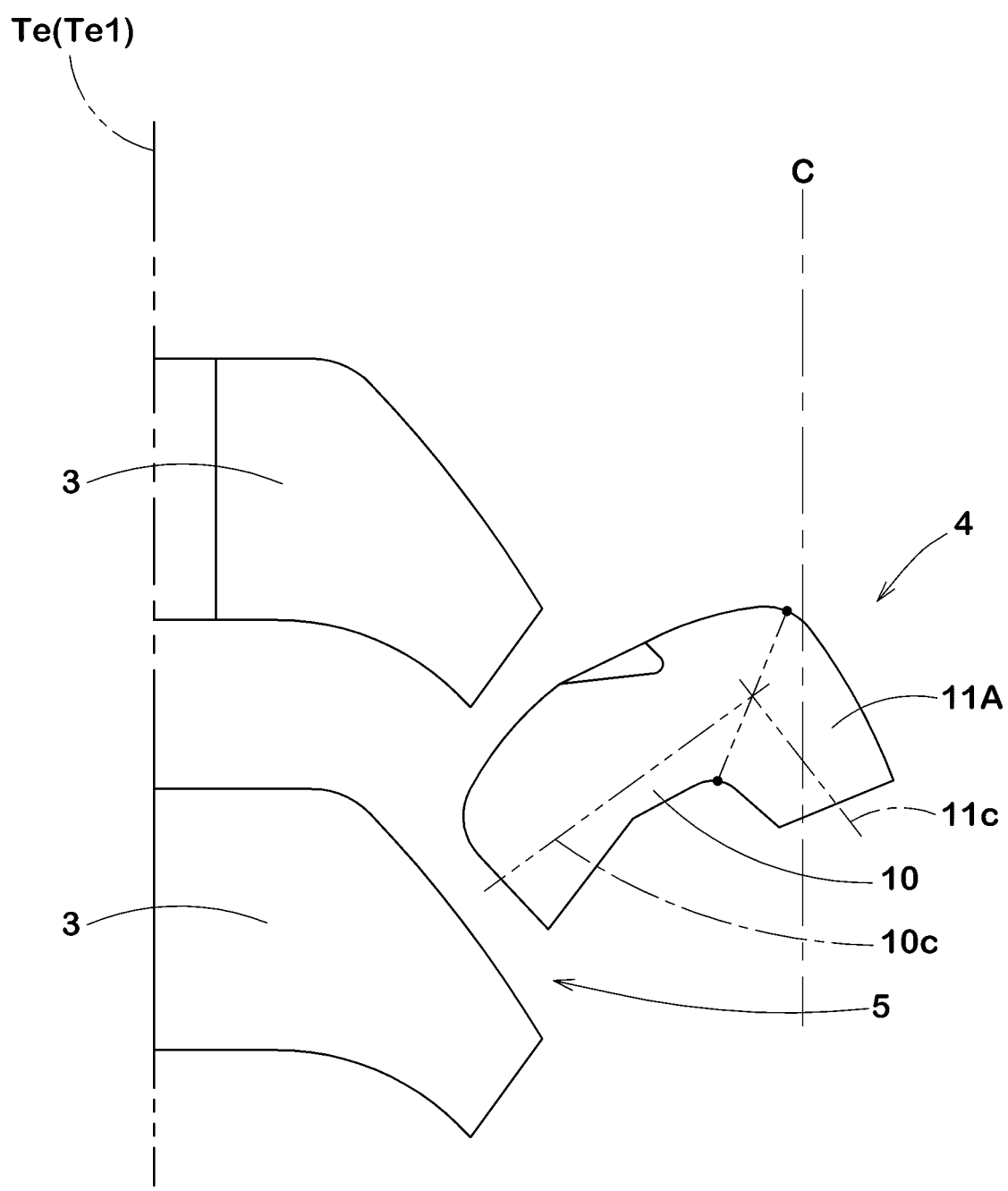
FIG. 6 is an enlarged view of the ground contacting surface of the crown block in second embodiment.

FIG. 6 shows the crown block 4 according to the second embodiment of the present invention. Same components as those of the crown block in the first embodiment described above are denoted by the same reference numbers, and the description thereof is omitted. The crown block 4 in the second embodiment has the second oblique portion 11A inclined toward the tire equator (C). Also in the second embodiment, the block center line (10c) of the first oblique portion 10 and the block center line (11c) of the second oblique portion 11A are inclined in opposite directions. The second oblique portion 11A in the second embodiment is inclined toward the tire equator (C). With the crown blocks 4 configured as such, mud stuck between the first oblique portion 10 and the second oblique portion 11A is easily discharged as well. Thereby, the mud performance is maintained high.

Figure 7:
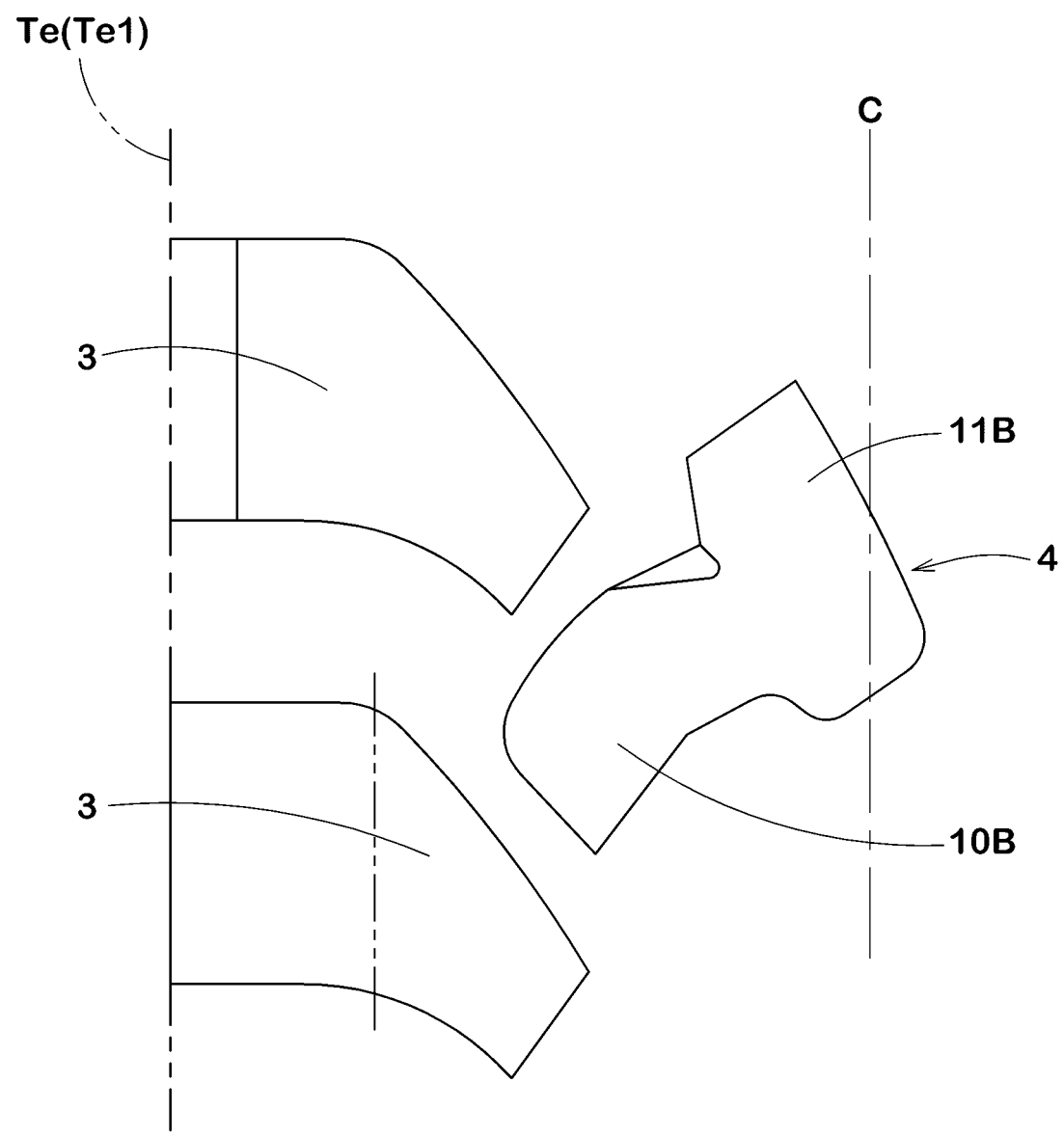
FIG. 7 is an enlarged view of the ground contacting surface of the crown block in third embodiment.

FIG. 7 shows the crown block 4 according to the third embodiment of the present invention. The crown block 4 in the third embodiment has the ground contacting surface in which the second oblique portion 11B and the first oblique portion 10B intersect in a T-shape. With the crown blocks 4 configured as such, mud stuck between the first oblique portion 10B and the second oblique portion 11B is easily discharged as well. Thereby, the mud performance is maintained high.

While detailed description has been made of the pneumatic tire as embodiments of the present invention, it is needless to say that the present invention can be embodied in various forms without being limited to the illustrated embodiments.

Working Example (Example)

Pneumatic tires for a 4WD-car having the basic pattern shown in FIG. 1 were made by way of test according to the specifications listed in Table 1, and then they were tested for the mud performance, the dirt performance, and the on-road performance. Major common specifications of the test tires and test methods are as follows.
Tread width TW: 240 mm
Height of crown blocks: 17.1 mm
Height of Shoulder blocks: 17.1 mm
<Mud Performance, Dirt Performance, On-Road Performance>

The test tires were mounted on all wheels of a 4WD-car with displacement of 3600 cc under the following conditions. Then a test driver drove the test car on a muddy road surface, a gravel road surface, and a dry asphalt road surface of a test course. And then the soil discharging performance on the muddy road surface and the running characteristics related to the drifting in accelerating condition and during steady running on the gravel road surface and the dry asphalt road surface were evaluated by the driver's feeling. The results are indicated by an evaluation point based on Reference 1 being 100, wherein a larger numerical value is better.
Tire Size: 37×12.50R17
Rim: 9.033
Tire pressure: 100 kPa
The test results, etc. are shown in Table 1.

TABLE 1

Figure 8:
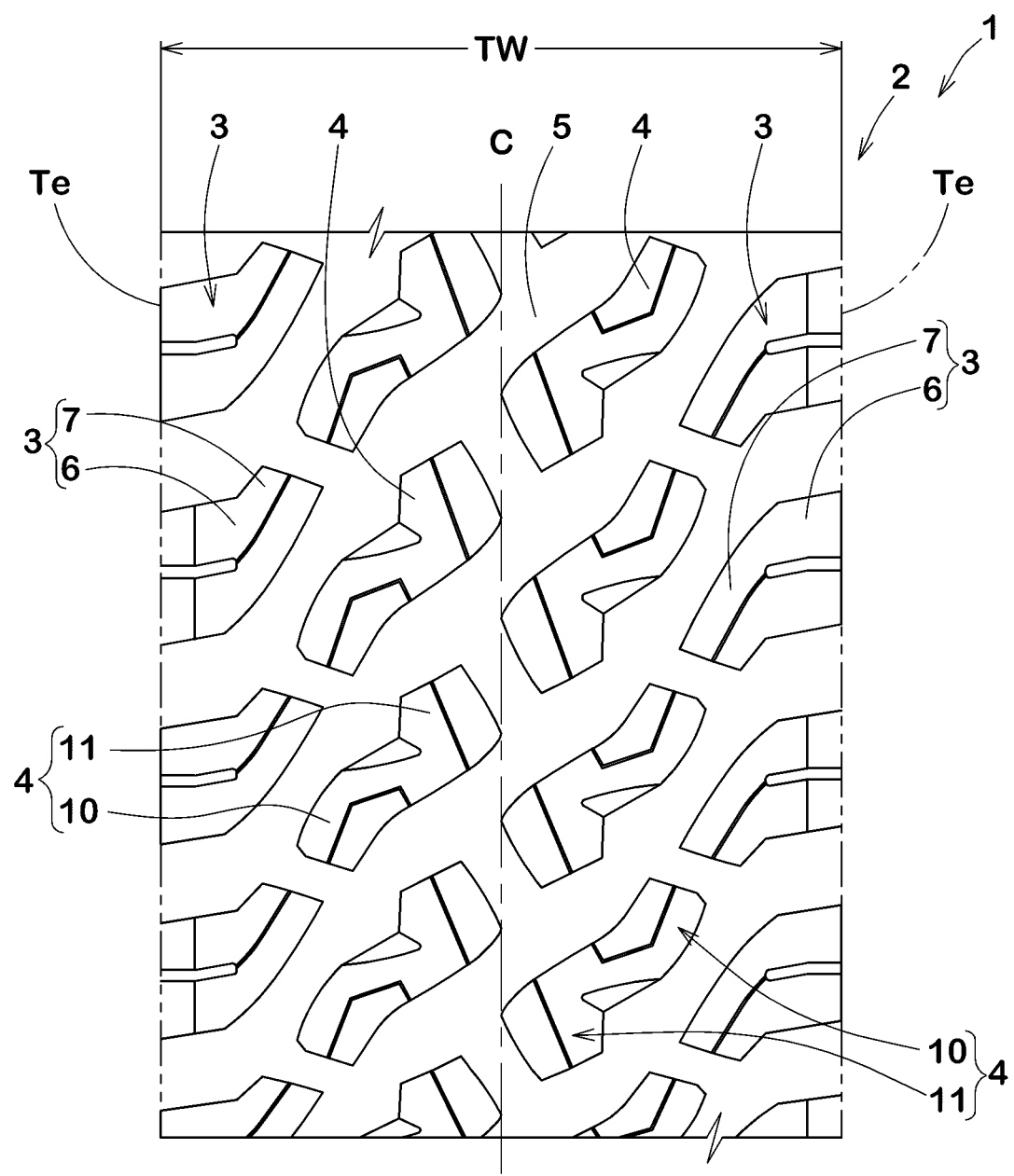
FIG. 8 is a development view of the tread portion of reference 1.

|  | Ref. 1 | Ref. 2 | Ex. 1 | Ex. 2 | Ex. 3 | Ex. 4 | Ex. 5 | Ex. 6 |
|---|---|---|---|---|---|---|---|---|
| Figure showing shape of Tread portion | FIG. 8 | FIG. 1 | FIG. 1 | FIG. 1 | FIG. 1 | FIG. 1 | FIG. 1 | FIG. 1 |
| Angle θ1 [degree] | 0 | 65 | 90 | 70 | 90 | 90 | 90 | 90 |
| Maximum lengths (Ls)/TW [%] | 30 | 30 | 30 | 30 | 20 | 25 | 35 | 40 |
| Distance (La) of Inner end of Crown block/TW [%] | 2 | 2 | 2 | 2 | 2 | 2 | 2 | 2 |
| Length (L1 + L2 + L3) of Groove portion/TW [%] | 140 | 140 | 140 | 140 | 140 | 140 | 140 | 140 |

TABLE 1-continued

| | | | | | | | | |
|---|---|---|---|---|---|---|---|---|
| Mud performance [evaluation point: larger is better] | 100 | 100 | 100 | 100 | 103 | 100 | 98 | 96 |
| Dirt performance [evaluation point: larger is better] | 100 | 103 | 110 | 108 | 107 | 109 | 110 | 110 |
| On-road performance [evaluation point: larger is better] | 100 | 103 | 110 | 108 | 107 | 109 | 110 | 111 |

| | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|
| Figure showing shape of Tread portion | FIG. 1 | FIG. 1 | FIG. 1 | FIG. 1 | FIG. 1 | FIG. 1 | FIG. 1 | FIG. 1 | FIG. 1 |
| Angle θ1 [degree] | 90 | 90 | 90 | 90 | 90 | 90 | 90 | 90 | 85 |
| Maximum lengths (Ls)/TW [%] | 30 | 30 | 30 | 30 | 30 | 30 | 30 | 30 | 30 |
| Distance (La) of Inner end of Crown block/TW [%] | 0 | 1 | 3 | 4 | 2 | 2 | 2 | 2 | 2 |
| Length (L1 + L2 + L3) of Groove portion/TW [%] | 140 | 140 | 140 | 130 | 130 | 135 | 145 | 150 | 150 |
| Mud performance [evaluation point: larger is better] | 102 | 100 | 98 | 96 | 103 | 100 | 98 | 96 | 100 |
| Dirt performance [evaluation point: larger is better] | 107 | 109 | 110 | 112 | 107 | 109 | 110 | 110 | 110 |
| On-road performance [evaluation point: larger is better] | 107 | 109 | 110 | 110 | 107 | 109 | 110 | 111 | 110 |

From the test results, it can be confirmed that the tires as the examples are improved as compared with the tires as the references on the dirt performance and the on-road performance while the mud performance is maintained. Further, the same test was carried out for tires having different size, but the same trend as these test results was shown.

The invention claimed is:

1. A tire comprising:
a tread portion comprising axially outer shoulder blocks and axially inner crown blocks, wherein
each of the shoulder blocks has a ground contacting surface comprising an axially outer portion extending axially inwardly from a first tread edge, and a steeply oblique portion extending axially inwardly from the axially outer portion and obliquely toward a second tread edge in a first tire circumferential direction, and having a larger inclination angle with respect to the tire axial direction than the axially outer portion,
each of the crown blocks has a ground contacting surface comprising a first oblique portion inclined to an opposite direction to the steeply oblique portion of the shoulder block and a second oblique portion extending from the first oblique portion and obliquely in an opposite direction to the first oblique portion, wherein the second oblique portion width decreases continuously from the first oblique portion,
in a development view of the tread portion, the steeply oblique portion longitudinal direction and the first oblique portion longitudinal direction intersect each other at an angle in a range of from 70 to 110 degrees,
the first oblique portion of each of the crown blocks comprises a first outer block edge facing axially outward,
the first outer block edge comprises a first outer long side portion extending axially inwardly from an outer end in the tire axial direction of the first outer block edge and obliquely toward one side in the tire circumferential direction, and a first outer short side portion extending axially inwardly from the outer end and obliquely toward the other side in the tire circumferential direction and having a smaller length in the tire axial direction than the first outer long side portion,
the first outer long side portion is connected by an arc with the first outer short side portion, and
an axially outer end point of each of the crown blocks is arranged axially outside a circumferential end point positioned furthest in the first tire circumferential direction of the steeply oblique portion.

2. The tire according to claim 1, wherein each of the first oblique portion and the second oblique portion is inclined with respect to the tire axial direction at an angle in a range of from 40 to 50 degrees,
an outer end in the tire axial direction of each of the crown blocks is provided in the first oblique portion thereof,
the second oblique portion includes a second outer block edge facing axially outward and a second inner block edge facing axially inward and extending across the tire equator,
the second outer block edge includes a second outer long side portion and a second outer short side portion having a smaller length in the tire axial direction than the second outer long side portion, and
the first outer long side portion includes an arc portion formed in an arc shape and protruding toward the steeply oblique portion.

3. The tire according to claim 1, wherein maximum widths of the shoulder blocks in the tire axial direction are in a range of from 25% to 35% of a tread width,
the steeply oblique portion of each of the shoulder blocks comprises an inner shoulder block edge facing toward the tire equator,
the inner shoulder block edge comprises an inner long side portion extending axially outwardly from an inner end in the tire axial direction of the inner shoulder block edge and obliquely toward one side in the tire circumferential direction, and an inner short side portion extending axially outwardly from the inner end and obliquely toward the other side in the tire circumferential direction and having a smaller length in the tire axial direction than the inner long side portion,
the first outer short side portion faces the inner long side portion with a groove interposed therebetween, wherein the groove includes a part on the tire equator side in which the groove width continuously increases toward the tire equator, and
in a pair of the shoulder blocks adjacent in the tire circumferential direction, the first outer long side portion of the crown block having the first outer short side portion facing the inner long side portion of one of the pair of the shoulder blocks faces the inner short side portion of the other one of the pair of the shoulder blocks with a groove interposed therebetween.

4. The tire according to claim 1, wherein
the ground contacting surfaces of the crown blocks extend across a tire equator,
the crown blocks include first crown blocks having respective major parts disposed on a side of the tire equator closer to one of the tread edges and second crown blocks having respective major parts disposed on a side of the tire equator closer to the other one of the tread edges, and
the first crown blocks and the second crown blocks are arranged alternately in a tire circumferential direction.

5. The tire according to claim 1, wherein
in each of the shoulder blocks, the axially outer portion includes a shoulder circumferential edge defining an axially outer ground contacting edge,
the shoulder circumferential edges include first circumferential edges provided on the tread edges and second circumferential edges provided axially inside the tread edges,
the shoulder blocks include outer shoulder blocks having the first circumferential edges and inner shoulder blocks having the second circumferential edges, and
the outer shoulder blocks and the inner shoulder blocks are arranged alternately in the tire circumferential direction.

6. The tire according to claim 1, wherein
in each of the shoulder blocks,
the axially outer portion includes a shoulder circumferential edge defining an axially outer ground contacting edge, and a first shoulder axial edge and a second shoulder axial edge extending axially inwardly from both ends of the shoulder circumferential edge,
the steeply oblique portion includes an inner shoulder block edge facing toward the tire equator and an outer shoulder block edge facing toward corresponding one of the tread edges,
the inner shoulder block edge includes an inner long side portion and an inner short side portion having a smaller length in the tire axial direction than the inner long side portion, and
the inner long side portion is smoothly connected with the second shoulder axial edge by an arc.

7. The tire according to claim 1, wherein
the tread portion includes a groove portion continuously connecting between both tread edges,
the groove portion includes a first axial direction portion, a second axial direction portion, and an oblique portion,
the first axial direction portion is a portion extending linearly in parallel with the tire axial direction from one of the tread edges,
the second axial direction portion is a portion extending linearly in parallel with the tire axial direction from the other tread edge,
the oblique portion is a portion extending linearly over an entire length thereof so as to connect the first axial direction portion and the second axial direction portion and is inclined to one side with respect to the tire axial direction,
the first axial direction portion length and the second axial direction portion length are each 15% or more and 25% or less of the groove portion length, and
the groove portion is not in contact with any of the blocks.

8. A tire comprising:
a tread portion comprising axially outer shoulder blocks and axially inner crown blocks, wherein
each of the shoulder blocks has a ground contacting surface comprising an axially outer portion extending axially inwardly from a first tread edge, and a steeply oblique portion extending axially inwardly from the axially outer portion and having a larger inclination angle with respect to the tire axial direction than the axially outer portion,
each of the crown blocks has a ground contacting surface comprising a first oblique portion inclined to an opposite direction to the steeply oblique portion of the shoulder block and a second oblique portion extending from the first oblique portion and obliquely in an opposite direction to the first oblique portion, wherein the second oblique portion width decreases continuously from the first oblique portion,
in a development view of the tread portion, the steeply oblique portion longitudinal direction and the first oblique portion longitudinal direction intersect each other at an angle in a range of from 70 to 110 degrees,
the first oblique portion of each of the crown blocks comprises a first outer block edge facing axially outward,
the first outer block edge comprises a first outer long side portion extending axially inwardly from an outer end in the tire axial direction of the first outer block edge and obliquely toward one side in the tire circumferential direction, and a first outer short side portion extending axially inwardly from the outer end and obliquely toward the other side in the tire circumferential direction and having a smaller length in the tire axial direction than the first outer long side portion,
the first outer long side portion is connected by an arc with the first outer short side portion,
the tread portion includes a groove portion continuously connecting between both tread edges,
the groove portion includes a first axial direction portion, a second axial direction portion, and an oblique portion,
the first axial direction portion is a portion extending linearly with a width in parallel with the tire axial direction from one of the tread edges,
the second axial direction portion is a portion extending linearly with a width in parallel with the tire axial direction from the other tread edge,
the oblique portion is a portion extending linearly with a width over an entire length thereof so as to connect the first axial direction portion and the second axial direction portion and inclined to one side with respect to the tire axial direction,
the first axial direction portion length and the second axial direction portion length are each 15% or more and 25% or less of the groove portion length, and
the groove portion is not in contact with any of the blocks.

9. The tire according to claim 8, wherein a length of the groove portion is 135% or more and 145% or less of a tread width.

10. The tire according to claim 8, wherein
each of the first oblique portion and the second oblique portion is inclined with respect to the tire axial direction at an angle in a range of from 40 to 50 degrees,
an outer end in the tire axial direction of each of the crown blocks is provided in the first oblique portion thereof,
the second oblique portion includes a second outer block edge facing axially outward and a second inner block edge facing axially inward and extending across the tire equator, the second outer block edge includes a second outer long side portion and a second outer short side portion having a smaller length in the tire axial direction than the second outer long side portion, and the first outer long side portion includes an arc portion formed in an arc shape and protruding toward the steeply oblique portion.

11. The tire according to claim 8, wherein maximum widths of the shoulder blocks in the tire axial direction are in a range of from 25% to 35% of a tread width, the steeply oblique portion of each of the shoulder blocks comprises an inner shoulder block edge facing toward the tire equator, the inner shoulder block edge comprises an inner long side portion extending axially outwardly from an inner end in the tire axial direction of the inner shoulder block edge and obliquely toward one side in the tire circumferential direction, and an inner short side portion extending axially outwardly from the inner end and obliquely toward the other side in the tire circumferential direction and having a smaller length in the tire axial direction than the inner long side portion, the first outer short side portion faces the inner long side portion with a groove interposed therebetween, wherein the groove includes a part on the tire equator side in which the groove width continuously increases toward the tire equator, and in a pair of the shoulder blocks adjacent in the tire circumferential direction, the first outer long side portion of the crown block having the first outer short side portion facing the inner long side portion of one of the pair of the shoulder blocks faces the inner short side portion of the other one of the pair of the shoulder blocks with a groove interposed therebetween.

12. The tire according to claim 8, wherein the ground contacting surfaces of the crown blocks extend across a tire equator, the crown blocks include first crown blocks having respective major parts disposed on a side of the tire equator closer to one of the tread edges and second crown blocks having respective major parts disposed on a side of the tire equator closer to the other one of the tread edges, and the first crown blocks and the second crown blocks are arranged alternately in a tire circumferential direction.

13. The tire according to claim 8, wherein in each of the shoulder blocks, the shoulder circumferential edges include first circumferential edges provided on the tread edges and second circumferential edges provided axially inside the tread edges, the shoulder blocks include outer shoulder blocks having the first circumferential edges and inner shoulder blocks having the second circumferential edges, the outer shoulder blocks and the inner shoulder blocks are arranged alternately in the tire circumferential direction, the axially outer portion includes a shoulder circumferential edge defining an axially outer ground contacting edge, and a first shoulder axial edge and a second shoulder axial edge extending axially inwardly from both ends of the shoulder circumferential edge, the steeply oblique portion includes an inner shoulder block edge facing toward the tire equator and an outer shoulder block edge facing toward corresponding one of the tread edges, the inner shoulder block edge includes an inner long side portion and an inner short side portion having a smaller length in the tire axial direction than the inner long side portion, and the inner long side portion is smoothly connected with the second shoulder axial edge by an arc.

14. A tire comprising:

a tread portion comprising axially outer shoulder blocks and axially inner crown blocks, wherein each of the shoulder blocks has a ground contacting surface comprising an axially outer portion extending axially inwardly from a first tread edge, and a steeply oblique portion extending axially inwardly from the axially outer portion and obliquely toward a second tread edge in a first tire circumferential direction, and having a larger inclination angle with respect to the tire axial direction than the axially outer portion, each of the crown blocks has a ground contacting surface comprising a first oblique portion inclined to an opposite direction to the steeply oblique portion of the shoulder block and a second oblique portion extending from the first oblique portion and obliquely in an opposite direction to the first oblique portion, and in a development view of the tread portion, a longitudinal direction of the steeply oblique portion and a longitudinal direction of the first oblique portion intersect each other at an angle in a range of from 70 to 110 degrees, and a circumferential end point positioned furthest in the first tire circumferential direction of the steeply oblique portion is arranged axially inside an axially outer end point of each of the crown blocks.

15. The tire according to claim 14, wherein each of the first oblique portion and the second oblique portion is inclined with respect to the tire axial direction at an angle in a range of from 40 to 50 degrees, an outer end in the tire axial direction of each of the crown blocks is provided in the first oblique portion thereof, the second oblique portion includes a second outer block edge facing axially outward and a second inner block edge facing axially inward and extending across the tire equator, the second outer block edge includes a second outer long side portion and a second outer short side portion having a smaller length in the tire axial direction than the second outer long side portion, and the first outer long side portion includes an arc portion formed in an arc shape and protruding toward the steeply oblique portion.

16. The tire according to claim 14, wherein maximum widths of the shoulder blocks in the tire axial direction are in a range of from 25% to 35% of a tread width, the steeply oblique portion of each of the shoulder blocks comprises an inner shoulder block edge facing toward the tire equator, the inner shoulder block edge comprises an inner long side portion extending axially outwardly from an inner end in the tire axial direction of the inner shoulder block edge and obliquely toward one side in the tire circumferential direction, and an inner short side portion extending axially outwardly from the inner end and obliquely toward the other side in the tire circumferential direction and having a smaller length in the tire axial direction than the inner long side portion, the first outer short side portion faces the inner long side portion with a groove interposed therebetween, wherein the groove includes a part on the tire equator side in which the groove width continuously increases toward the tire equator, and in a pair of the shoulder blocks adjacent in the tire circumferential direction, the first outer long side portion of the crown block having the first outer short side portion facing the inner long side portion of one of the pair of the shoulder blocks faces the inner short side portion of the other one of the pair of the shoulder blocks with a groove interposed therebetween.

17. The tire according to claim 14, wherein the ground contacting surfaces of the crown blocks extend across a tire equator, the crown blocks include first crown blocks having respective major parts disposed on a side of the tire equator closer to one of the tread edges and second crown blocks having respective major parts disposed on a side of the tire equator closer to the other one of the tread edges, and the first crown blocks and the second crown blocks are arranged alternately in a tire circumferential direction.

18. The tire according to claim 14, wherein in each of the shoulder blocks, the axially outer portion includes a shoulder circumferential edge defining an axially outer ground contacting edge, the shoulder circumferential edges include first circumferential edges provided on the tread edges and second circumferential edges provided axially inside the tread edges, the shoulder blocks include outer shoulder blocks having the first circumferential edges and inner shoulder blocks having the second circumferential edges, and the outer shoulder blocks and the inner shoulder blocks are arranged alternately in the tire circumferential direction.

19. The tire according to claim 14, wherein in each of the shoulder blocks, the axially outer portion includes a shoulder circumferential edge defining an axially outer ground contacting edge, and a first shoulder axial edge and a second shoulder axial edge extending axially inwardly from both ends of the shoulder circumferential edge, the steeply oblique portion includes an inner shoulder block edge facing toward the tire equator and an outer shoulder block edge facing toward corresponding one of the tread edges, the inner shoulder block edge includes an inner long side portion and an inner short side portion having a smaller length in the tire axial direction than the inner long side portion, and the inner long side portion is smoothly connected with the second shoulder axial edge by an arc.

20. The tire according to claim 14, wherein the tread portion includes a groove portion continuously connecting between both tread edges, the groove portion includes a first axial direction portion, a second axial direction portion, and an oblique portion, the first axial direction portion is a portion extending linearly in parallel with the tire axial direction from one of the tread edges, the second axial direction portion is a portion extending linearly in parallel with the tire axial direction from the other tread edge, the oblique portion is a portion extending linearly over an entire length thereof so as to connect the first axial direction portion and the second axial direction portion and inclined to one side with respect to the tire axial direction, the first axial direction portion length and the second axial direction portion length are each 15% or more and 25% or less of the groove portion length, and the groove portion is not in contact with any of the blocks.

* * * * *